Aug. 23, 1966 K. C. BUGG 3,267,771
MOTION TRANSMITTING MECHANISM
Filed March 9, 1964 7 Sheets-Sheet 5

INVENTOR.
Kenly C. Bugg
BY
Hume, Groen, Clement + Hume
attys

Aug. 23, 1966　　　　　K. C. BUGG　　　　　3,267,771
MOTION TRANSMITTING MECHANISM
Filed March 9, 1964　　　　　　　　　　　　7 Sheets-Sheet 6

Fig. 11

INVENTOR.
Kenly C. Bugg
BY
Hume, Groen, Clement + Hume
Attys

United States Patent Office 3,267,771
Patented August 23, 1966

3,267,771
MOTION TRANSMITTING MECHANISM
Kenly C. Bugg, Fort Wayne, Ind., assignor to Kendick Manufacturing Company, Inc., Fort Wayne, Ind., a corporation of Indiana
Filed Mar. 9, 1964, Ser. No. 350,459
15 Claims. (Cl. 74—798)

This invention relates to a motion transmitting mechanism and more particularly, to a device which is adapted for use as a planetary frictional drive or as a frictional clutch or a combination of the two. This invention also relates to a method of assembling motion transmitting mechanisms having a housing and a plurality of compressible ring members so that the latter are concentrically disposed in compressed relation between a drive shaft and said housing in a plane normal to said shaft.

This invention is an outgrowth of the need for electromechanical control systems having a high degree of precision, such as those now required for computers, space vehicles and similar applications. The invention is particularly useful in servomechanisms incorporating speed reducers or differential drives, for example.

Although many different forms of planetary frictional drive mechanisms have been previously developed, such as those disclosed in the copending application of applicant, Serial No. 106,862 filed May 1, 1961, now Patent No. 3,160,031, and various methods of eliminating sources of error such as backlash, resiliency, inertia and wear have been devised, one very significant drawback of most devices has been the relative difficulty encountered in assembling the required components. This has limited the use, for example, of planetary frictional drives utilizing compressible ring members as motion transmitting components of the general type shown for example in the Altham Patent No. 526,887, issued October 2, 1894, and the Hult Patent No. 537,977, issued April 23, 1895. Such difficulties in assembly have been further increased by the modern trend toward miniaturization in control systems for use in installations where great emphasis is laid on space and weight saving.

It is, therefore, an object of this invention to provide a motion transmitting mechanism that is particularly useful in planetary frictional drive and clutch mechanisms, and an improved method for assembling such motion transmitting devices.

It is a further object of this invention to provide a motion transmitting mechanism in which the amount of undesirable backlash and resilience has been reduced to a minimum; that is, therefore, extremely accurate; that lends itself particularly to extreme miniaturization without any loss of accuracy or greatly increased cost; and which permits a relatively easy assembly of the motion transmitting mechanism and related components to thus make possible the use of constructions previously not practical, particularly in devices of a so-called miniature type.

It is a further object to provide a device of the character described in which undesirable inertia effects have been substantially eliminated and in which there is a minimum of wear. Furthermore, if wear does occur in the device herein described when utilized as a planetary frictional drive, such wear will produce merely a change in ratio that is purely linear, rather than the highly undesirable nonlinear change that normally occurs in a gear train type of drive arrangement as a result of an increase in backlash.

A still further object is to provide a device of the character described in which undesirable friction has been reduced to a minimum when it is used as a planetary device.

Still another object is to provide such a device which, when used as a planetary drive mechanism, has inherent friction slip clutch action which may be adjusted to operate at a selected load and, therefore, will serve to protect the operating mechanism from overload damage. When used as a clutch, it may likewise be readily adjusted to slip at a predetermined maximum load without damage to the mechanism.

A further object is to provide a device which may be readily incorporated in more complete components, such as speed reducers or differential drives which have an in-line, coaxial construction, as distinguished from the offset arrangement which has heretofore been necessary when spring loaded or anti-backlash gears are utilized in an attempt to eliminate some of the sources of error which otherwise will be associated with this type of equipment.

The improved method of assembling a motion transmitting mechanism herein disclosed also makes possible the ready assembly and disassembly of individual components of more elaborate devices, such as speed reducers or differential drives of the type disclosed in applicant's copending application referred to above. The application of such a method permits a modular approach to the construction of these more elaborate devices and gives a flexibility and replaceability to installations of this type never before realized. Such a characteristic is particularly important in the military field where facility of repair or replacement of faulty components is of paramount importance.

Further objects and advantages of this invention will become evident as the description proceeds and from an examination of the accompanying drawings which illustrate several embodiments of the invention and in which similar numerals refer to similar parts throughout the several views.

Figure 1:
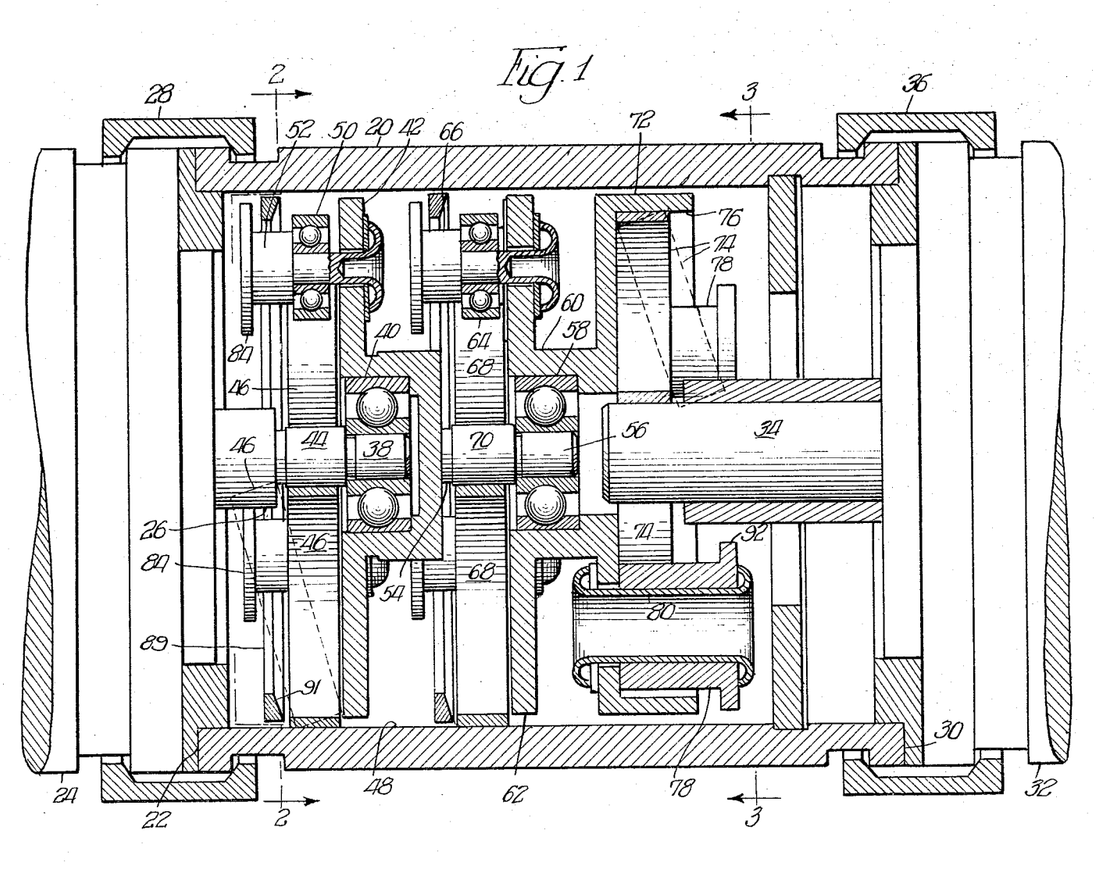
FIGURE 1 is a view in elevation, with certain parts cut away, of one form of device incorporating the invention, the device being shown disposed in association with a drive motor and a driven component, such as a control transformer, the latter two elements being shown only in fragmentary form.

Referring now to FIGURE 1, a speed reducer is shown therein utilizing planetary frictional drive mechanisms and a friction clutch element, both of which incorporate motion transmitting mechanisms embodying the invention.

Figures 2, 3, 4, 5:
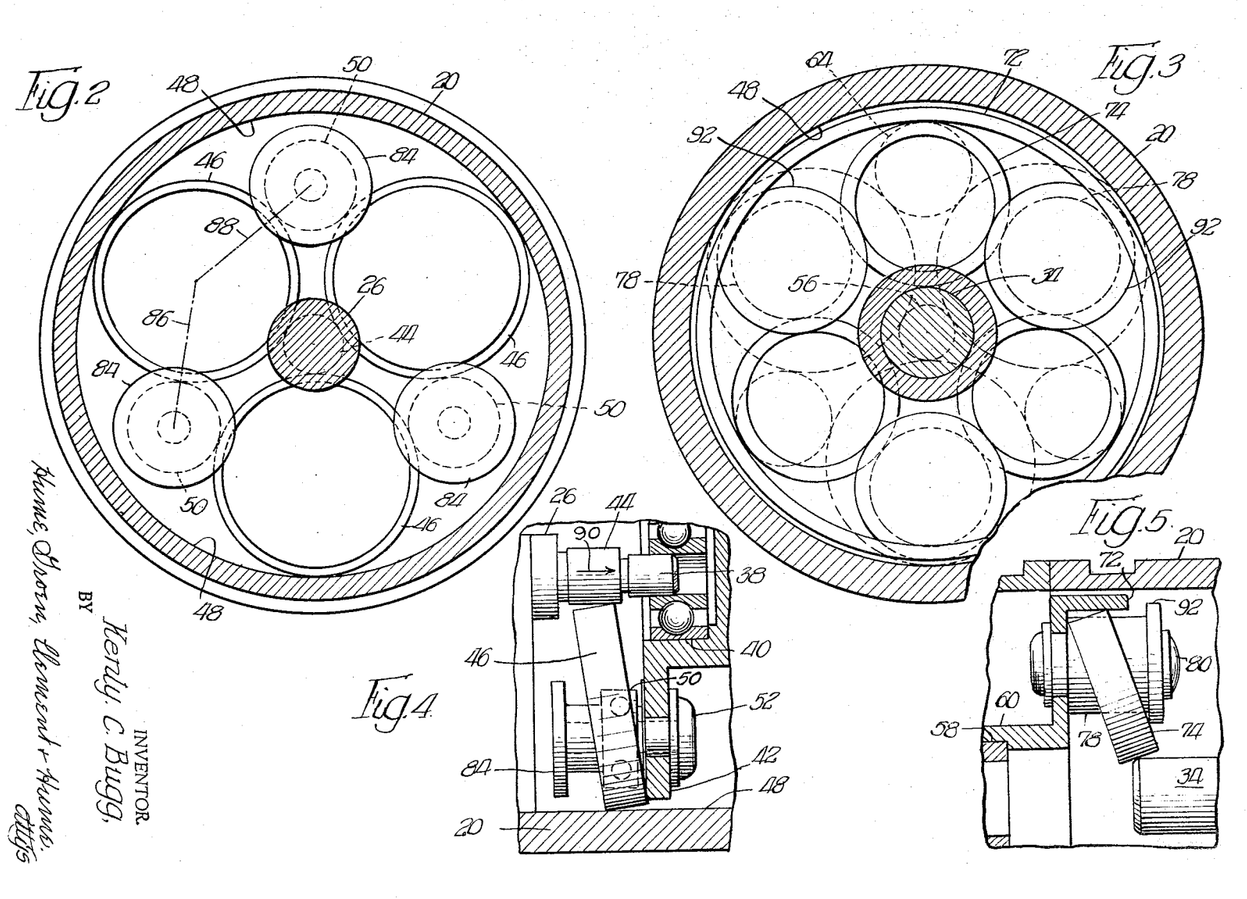
FIGURE 2 is a somewhat diagrammatic representation of the operative relationship of certain of the components in the device shown in FIGURE 1, the view being taken along the line 2—2 of that figure.
FIGURE 3 is another somewhat diagrammatic representation of the operative relationship of certain other of the components in the device shown in FIGURE 1, the view being taken along the line 3—3 of that figure.
FIGURE 4 is a detailed view in elevation, with certain parts cut away, of a fragmentary portion of the device shown in FIGURE 1, showing the manner of inserting the drive shaft into association with the compression rings, the latter being shown in the cocked position.
FIGURE 5 is a detailed view in elevation, with certain parts cut away, of another fragmentary portion of the device shown in FIGURE 1 showing the manner in which the output of the drive mechanism is coupled to the input shaft of the driven component.

The components of the speed reducer are contained within a housing 20 in the form of a hollow cylinder. The housing 20 is coupled at one end 22 to a drive motor 24 having an output shaft 26 by the clamp ring 28. The opposite end 30 of the housing 20 is adapted to be secured to one end of a driven unit, such as the control transformer 32 having the input shaft 34, by the clamp ring 36. The outer extremity 38 of the motor output shaft 26 is received within the bearing 40 of the cage member 42 so that the latter is freely rotatable thereon. As best shown in FIGURE 2, a plurality of compression rings 46 are symmetrically disposed within the housing 20 in abutting relation to the cylindrical inner surface 48 thereof and to an intermediate section 44 of the output shaft 26 of the motor 24 which has a diameter slightly larger than the adjacent outer extremity 38 of the shaft 26. As will be more fully explained below, these rings are normally disposed in a plane normal to the axis of the shaft 26 in rolling frictional contact with the area 44 of the shaft 26 and with the inner surface 48 of the housing 20.

A plurality of bearing members 50 are carried by the rivets or eyelets 52 and are normally in light compressional engagement with the compression rings 46, as best shown in FIGURE 2. The rings 46 are normally compressed between the area 44 and the inner surface 48, so that rotation of the motor shaft 26 will in turn cause rotation of the compression rings 46, and since the housing 20 is fixed, the former will be caused to move in a planetary fashion around the shaft 44. Such movement of the compression rings 46 will impart a rotary movement to the cage 42 through the bearing members 50. This rotation of the cage 42 will cause the output shaft 54, secured in axial alignment to the cage 42, to likewise rotate. The outer extremity 56 of the shaft 54 has a reduced diameter and it is received within the bearing 58 supporting the double cage member 60. One half 62 of the cage member 60 carries the bearing members 64 rotatable on the rivets or eyelets 66. The compression rings 68, similar to the rings 46, are symmetrically disposed within the housing 20 in abutting relation to the inner cylindrical surface 48 thereof and normally in a plane normal to the axis thereof. The rings 68 are compressed between the inner surface 48 of the housing 20 and the area of increased diameter 70 of the output shaft 54 carried by the cage 42, as best shown in FIGURE 3.

Rotation of the output shaft 54 will cause rotation of the compression rings 68 in the opposite direction and these in turn will move in a planetary manner around the shaft 54 since the rings 68 are in rotating frictional contact with the inner surface 48 of the housing 20. Movement of the compression rings 68 in the manner described will cause the bearings 64 to likewise be moved in a planetary manner around the shaft 54 and they will carry with them the cage 60, since the bearings 64 are secured thereto through the rivet members 66.

The other half 72 of the cage member 60 is in the form of a cup which is in coaxial alignment with the input shaft 34 of the control transformer 32. A plurality of compressible ring members 74 are symmetrically disposed within the cup member 72 in abutting relation to the cylindrical, inner surface 76 thereof and normally in a plane normal to the axis of the shaft 34 and the cage 60. These rings 74 are disposed in compressed relation between the inner surface 76 of the cage 72 and the outer extremity of the shaft 34, as best shown in FIGURE 3. The cage 72 has secured thereto in nonrotatable relation the stop bushings 78 by the rivet members or eyelets 80. The bushings 78 are in light compressional engagement with the compression rings 74, as best shown in FIGURE 3. The shaft member 34 is therefore in motion transmitting frictional engagement with the cage 72 through the compression rings 74 which are normally held in non-rotatable engagement by the bushings 78. This portion of the assembly therefore functions as a clutch member.

Although it is not apparent so far, from the description so far, the speed reducer just described has certain novel characteristics which spell the difference between practicality and impracticality from the standpoint of cost of construction and ultimate commercialization. Reference is had to the fact that the internal components of the device are so designed that assembly thereof is greatly facilitated and simplified. One of the characteristics referred to is further illustrated in FIGURE 4 where the manner of insertion of the shaft 26 is shown in some detail. As there indicated, the compression rings 46 have been cocked in a manner represented by the dotted line showing in FIGURE 1 prior to the insertion of the shaft 26 so that the extremities of the rings 46 which are adjacent to the shaft 26 are moved outwardly along the axis of the shaft away from the main body of the device shown in FIGURE 1. The rivet members or eyelets 52 which support the bearing members 50 extend laterally a distance substantially greater than the width of the compression rings 46, as shown in both FIGURES 1 and 4. A flanged head 84 is provided on members 52 having a diameter such that it overlaps the periphery of a compression ring 46 with which the bearing 50 is in abutment, as best shown in FIGURE 2. The head 84 therefore forms a stop for the compression ring 46 when it is cocked in the manner shown in FIGURE 4 and permits only the degree of displacement which is there illustrated. When the rings 46 are so disposed, they are not under compression from the shaft 26 but are normally slightly compressed between the bearings 50.

As shown in FIGURE 2, the lines of tangency 86 and 88 of the rings 46 with the bearings 50 are less than 180° apart and therefore the rings 46, in the absence of the shaft 26, will still be retained in the position shown, in abutment with the inner surface 48 of the housing 20. Likewise, the outward pivotal movement of the compression rings 46 as illustrated in FIGURE 4 is readily permitted without affecting the holding properties of the bearings 50 with respect to the rings 46 and their maintenance within the housing 20.

As shown in FIGURE 1, a retaining ring 89 is disposed adjacent the compression rings 46 and the flanged heads 84 of the rivet members or eyelets 52. This type of retaining ring is also disposed in association with the other sets of compression rings which will be described below and its function is to prevent undesirable lateral shifting of the compression rings during high speed operation. Each ring 89 has a diameter somewhat smaller than the inner diameter of the housing in which it is disposed, such as the housing 20 in FIGURE 1. A chamfered portion 91 is provided on the ring 89 adjacent the compression rings so as to permit the cocking of the rings just described.

As best shown in FIGURE 4, the reduced portion 38 of the shaft 26 is of a diameter such that it will be able to be inserted between the rings 46 when so cocked and the area of increased diameter 44 will be brought into abutment with the flat outer periphery of the rings 46. When a compressive force is applied in the direction of the arrow 90, shown in FIGURE 4, the rings 46 will be somewhat compressed and will begin to pivot back toward their normal position as shown in FIGURE 1. Further movement in that direction will cause the rings to snap into compressed relation between the shaft area 44 and the housing 20 in a plane normal to the shaft as shown in FIGURE 1.

As shown in FIGURE 5, a somewhat similar construction is provided on the outer half 72 of the cage member 60 where a flanged head 92 is formed on the stop bushings 78 to act as a stop for the compression rings 74 when they are cocked so that the inner extremities thereof closest to the shaft 34 extend outwardly away from the main body of the cage 60. Just as in the case of the shaft 26, when the shaft 34 is brought into abutment with the inner extremities of the cocked rings 74, further compressive force applied inwardly along the axis of the shaft 34 will cause the rings 74 to compress and permit the extremity of the shaft 34 to move inwardly between the rings 74 while simultaneously causing the rings to pivot into the position shown in full lines in FIGURE 1. As in the case of the rings 46, the rings 74 will ultimately snap into place in compressed relation between the shaft 34 and the housing 20 in a plane substantially normal to said shaft.

Although the shafts 26 and 34, when so inserted as just described, are in substantial frictional engagement with the compression rings (sufficient to successfully transmit the rotation of the shafts to the rings), they nevertheless can be withdrawn from association with the rings by the application of a sufficient force in a direction opposite to that which was used to insert them. After such withdrawal, the shafts can again be inserted in the manner previously described by first cocking the rings, as in the prior instance, and then following the same procedure outlined before. This characteristic is of considerable value in permitting the replacement of components as desired.

The other half 62 of the cage 60 has a construction substantially identical to the cage 42 and the compression rings 68 can be cocked in the manner described for the compression rings 46 in order to permit the assembly of the two cage members 42 and 60 with the shaft 54 being inserted into operative relation with the compression rings 68. The value of this snap-in type of assembly for components normally disposed well within the housing 20 is immediately apparent. It is also apparent that both the assembly of the reducer itself and its disposition as an element, in the train of elements which includes the driving motor and the control transformer, is greatly facilitated by the snap-in characteristics of the various components of the reducer.

This unit as described and shown has been fabricated as a speed reducer having a ratio of 100 to 1. In miniaturized form such a unit can have an operating load torque of 3 inch-ounces, with an input torque of .01 inch-ounce and an accuracy such that its maximum lost motion at its rated torque on output is only 1 minute.

Figure 6:
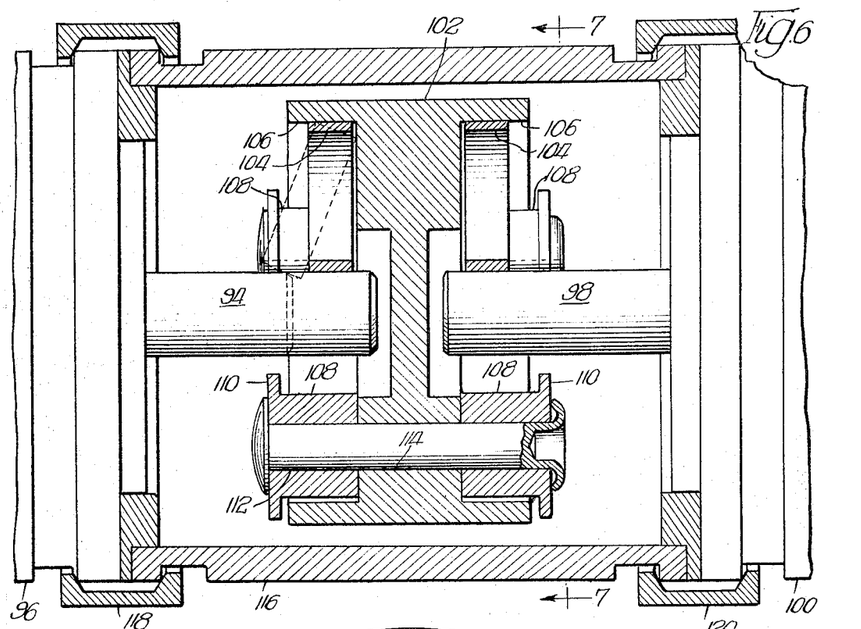
FIGURE 6 is a view in elevation, with certain parts cut away, of an alternate form of device incorporating the invention, the device being shown disposed in association with a drive motor and shaft and a driven component and shaft such as a control transformer, with the motor and control transformer being shown only in fragmentary form.

The form of clutch arrangement described in connection with the device, shown in FIGURE 1, and employing the cup 72, the rings 74 and the bushings 78, can be utilized in an alternative form of device, such as is shown in FIGURE 6. Here the motion transmitting mechanism provides for a direct transfer of the motion of the output shaft 94 of the motor, generator or control motor 96 to the input shaft 98 of the control transformer or other transducer 100. A double cage member 102 is provided which has two identical halves disposed back-to-back, each half having substantially the same construction as the half 72 of the cage member 60 previously described and shown in FIGURE 1.

Each half of the cage member 102 has a plurality of compression rings 104 functioning in the same manner as the compression rings 74. They are normally disposed in compressed relation between the inner surface 106 and the shafts 94 and 98. The stop bushings 108 have the same function as the bushings 78 previously described, and are each provided with the stop flange 110 corresponding to the flange 92 on the bushings 78. A single rivet or eyelet member 112 extends laterally through a suitable opening 114 in the cage member 102 to mount a pair of bushings 108 in opposed relation on opposite sides of the cage member. As in the case of the bushings 78, the bushings 108 are secured in fixed relation to the cage 102 and are adapted to hold the compression rings 104 against rotation. This in turn provides a frictional gripping of the shafts 94 and 98 so that rotary motion from one to the other is transferred through the cage 102.

As previously described in connection with the half 72 of the cage member 60, the shafts 94 and 98 can be inserted after the compression rings 104 are first cocked, as illustrated in the dotted line representation thereof in FIGURE 6. A snap-in assembly of the clutch member and the driving and driven components 96 and 100, respectively, is therefore possible. In the actual assembly process, the cage member 102 may be mounted on the shaft 94 with the compression rings 104 on the opposite side of the cage member 102 remaining in the cocked position. The housing 116 may then be slipped over the cage member 102 and secured to the input motor 96 by the clamp ring 118. The input shaft 98 of the control transformer 100 may then be inserted into position, as shown in FIGURE 6, with the compression rings 104 in gripping engagement therewith. The clamp ring 120 may then be secured in place to maintain the housing 116 and the control transformer 100 in secured axial alignment. As stated previously in connection with the description of the clutch portion of the device shown in FIGURE 1, the device just described permits the removal of the shafts 94 and 98 from gripping engagement with the cage 102 by the application of a withdrawal force along the axis of the shafts 94 and 98. Subsequent to such withdrawal, the assembly operation can be again carried out merely by cocking the compression rings 104 in the manner previously described and bringing the components together into cooperative relation.

Figure 7:
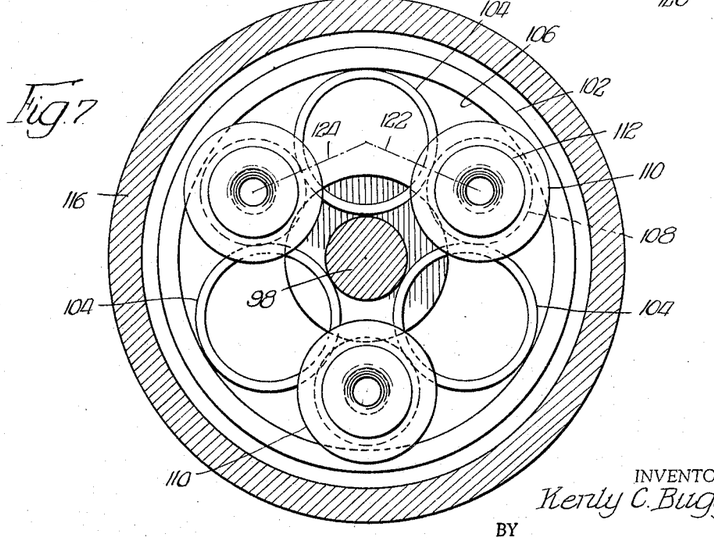
FIGURE 7 is a somewhat diagrammatic representation of the operative relationship of certain of the components in the device shown in FIGURE 6, the view being taken along the line 7—7 of that figure.

The manner in which the various components shown in FIGURE 6 making up the clutch assembly are disposed relative to one another is best shown in FIGURE 7. The lines of tangency 122 and 124 between the stop bushings 108 and the outer periphery of the compression rings 104 are shown to include an angle of substantially less than 180°, so that the compression rings 104 are normally held in place by the stop bushings 108 in a manner which permits them to be cocked as shown in FIGURE 6, and as previously described in connection with the device shown in FIGURE 1.

Figure 8:
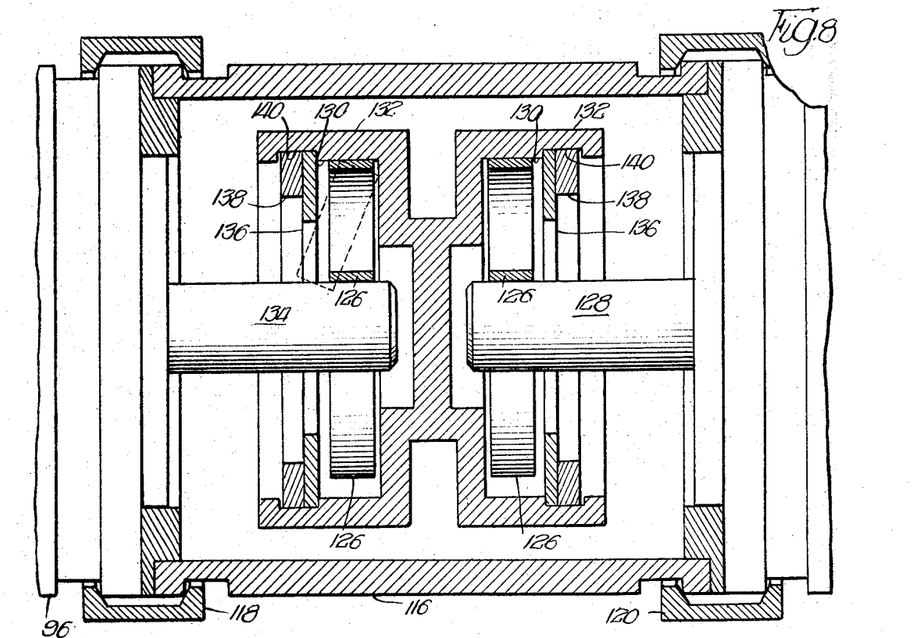
FIGURE 8 is a view in elevation, with certain parts cut away, of another alternate form of device incorporating the invention, the device being shown disposed in association with a drive motor and shaft, and a driven component and shaft, such as a control transformer, with the motor and control transformer being shown only in fragmentary form.
Figure 9:
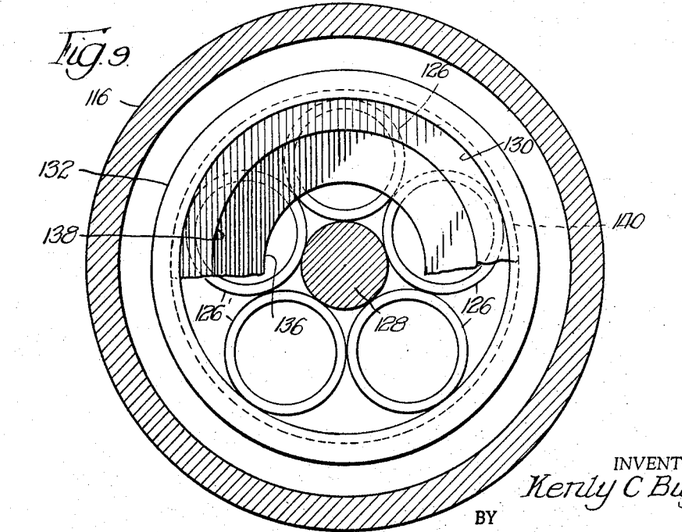
FIGURE 9 is a somewhat diagrammatic representation of the operative relationship of certain of the components in the device shown in FIGURE 8, the view being taken along the line 9—9 of that figure.

As shown in FIGURE 8, an alternative form of construction for such a motion transmitting mechanism in the form of the clutch may be provided. This form is similar to that shown in FIGURES 6 and 7 but in place of the stop bushings 108 only compression rings 126 are utilized. As best shown in FIGURE 9, the rings 126 are disposed about the shaft 128 in compressed relation between the inner surface 130 of one half of the cage 132. However, they differ from the compression rings 104, previously described, in that they also are in compressed relation to one another. This compressive frictional contact between adjacent rings 126 prevents rotation thereof so that they then move as a unit with the rotation of the shaft 128 and in turn, cause the cage member 132 to rotate with the shaft 128.

The other half of the cage 132, which is associated with the shaft 134, has a similar construction and arrangement insofar as the compression rings 126 are concerned. Both halves are provided with retaining rings 136 held in place by the resilient split ring 138 in the slot 140 provided for that purpose in the inner surface 130 of each half of the cage member 132. As shown by the dotted line representation of the compression ring 126, the retaining rings 136 perform the same function as the flanged head on the stop bushings previously described and shown in FIGURE 6. The compression rings 126 may be cocked, in the manner previously described, so that their inner extremities are moved outwardly until the ring 126 comes into abutment with the inner edge of the retaining rings 136.

The assembly of the various components, as shown in FIGURE 8, is carried out in substantially the same way as previously described for the components shown in FIGURE 6, with the housing 116 encompassing the clutch member and maintained in association with the input motor 96 and the control transformer 100 by the clamp rings 118 and 120, respectively.

Figure 10:
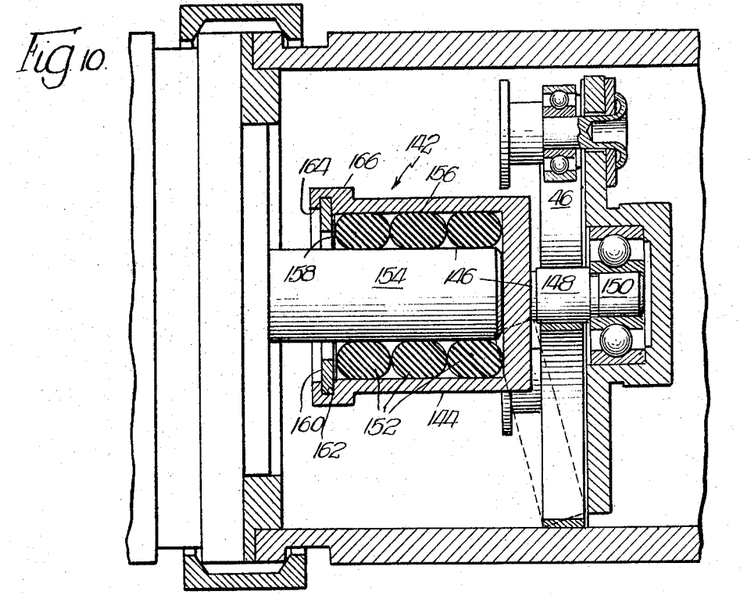
FIGURE 10 is a view in elevation, with certain parts cut away, of an adapter unit for use with devices incorporating the invention, the adapter being shown in association with a fragmentary portion of the device shown in FIGURE 1 and a drive motor shown only in fragmentary form.

Although the motor 24, illustrated in FIGURE 1, is shown with a shaft member 26 having a plurality of areas of reduced diameter, it may be commercially desirable to permit the reducer shown and described therein to be utilized with a standard shaft. As shown in FIGURE 10, an adapter, indicated generally by the numeral 142, may be provided for this purpose. The main body of the adapter is made up of a cup-like member 144 having a shaft member 146 extending outwardly from the base thereof along the longitudinal axis of the cup. The shaft 146 is provided with a bearing area 148, comparable to the area 44 of the shaft 26 shown in FIGURE 1, together with an area of reduced diameter 150, comparable to the area 38 of the shaft 26.

The interior of the cup portion 144 has disposed therein a plurality of O-rings 152 made of suitable resilient material, the inner diameter of the central opening in these O-rings being slightly smaller than the diameter of the shaft 154 to be received therein. In order to maintain precise dimensional stability, the outer periphery 156 of the O-rings is ground flat so that the rings are positively seated within the cup member 144 under slight compression. The rings 152 are held in place within the cup portion 144 by a retaining ring 158 which is in turn held in place by the split ring 160 adapted to be seated in the groove 162 in the inner surface 164 of the base 166 of the adapter 142.

This arrangement permits the insertion of a motor shaft 154 into frictional gripping relation with the adapter 142. It is an added advantage that the adapter will operate successfully on either a smooth surfaced shaft or a toothed or grooved shaft adapted to operate a pinion take-off. Likewise, the adapter is designed to have a minimum of inertia effect, both because of its relatively small diameter and also its minimum mass. The use of such an adapter eliminates the necessity of having a special shaft in the motor and therefore, makes the components, such as the reducer shown in FIGURE 1, readily compatible with existing conventional devices. This adapter, when coupled with the snap-in characteristic of the devices previously described, gives a maximum of flexibility and adaptability to the devices incorporating the invention.

Figure 11:
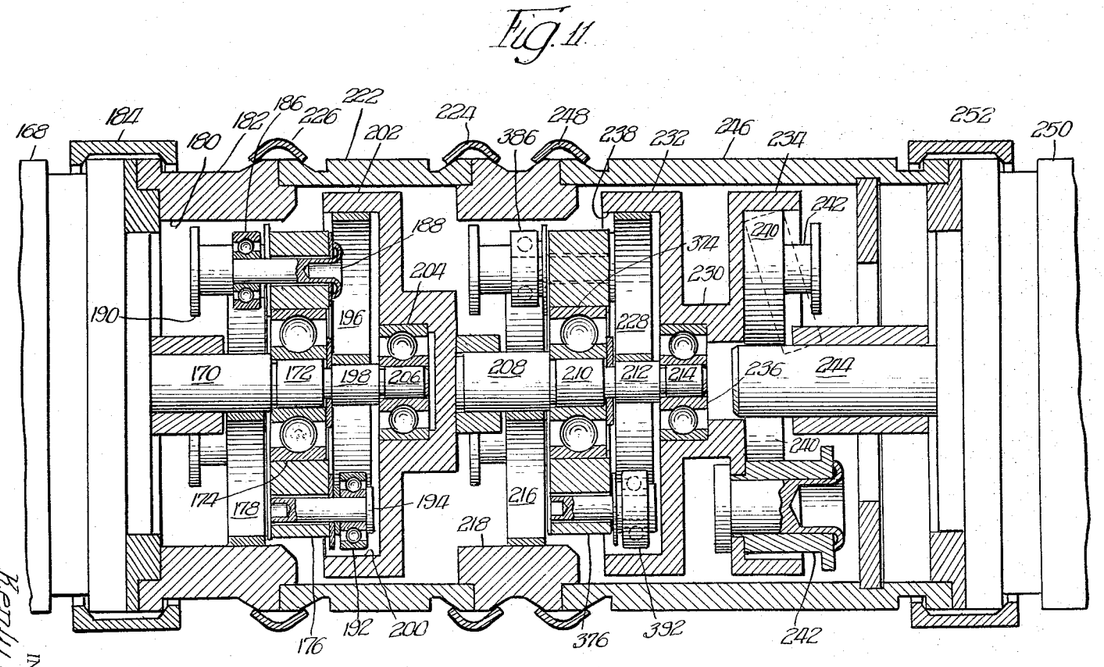
FIGURE 11 is a view in elevation, with certain parts cut away, of still another alternate form of device incorporating the invention, the device being shown disposed in association with a drive motor and shaft and a driven component and shaft, such as a control transformer, with the motor and control transformer being shown only in fragmentary form.

Referring now to FIGURE 11, another form of device incorporating the invention is shown therein. This device takes the form of a differential reducer incorporating a planetary frictional drive mechanism and a clutch mechanism but the planetary drive is somewhat different than that previously described in connection with the device shown in FIGURE 1.

More specifically, as shown in FIGURE 11, the motor 168 has an output shaft 170 with an area of reduced diameter 172 which is inserted in the bearing member 174 rotatably supporting the cage member 176. The compression rings 178 are adapted to be disposed in compressed relation between the surface of the shaft 170 and the inner surface 180 of the housing element 182 which is secured to the motor 168 by the clamp 184. Additional bearings 186 are each rotatably mounted on a rivet or eyelet member 188 which is in turn provided with a flanged head 190 substantially like the members 52 and 84 shown in FIGURE 1.

Similar bearing members 192 are rotatably mounted on the opposite side of the cage member 176 on the rivets or eyelets 194. These bearing members 192 are normally disposed in rolling frictional contact with the compression ring members 196. The ring members 196 are in turn normally disposed in compressed relation between the additional area of reduced diameter 198 of the shaft 170 and the inner surface 200 of the cup-like cage member 202.

The cage member 202 is rotatably supported by the bearing 204 on the area of reduced diameter 206 of the shaft 170. The cage 202 is in turn provided with an output shaft 208 having similar areas of reduced diameter 210, 212, and 214. Compression rings 216, disposed in compressed relation between the surface of the shaft 208 and the inner surface 218 of the housing member 220, are comparable to the compression ring members 178 previously described. The housing member 220 is secured to the housing member 222 by the clamp ring 224, with the housing member 222 being secured to the housing member 182 by the clamp ring 226.

Cage member 376 (a duplicate of cage member 176) is rotatably mounted on the area of reduced diameter 210 on the shaft 208 through the bearing 374. Bearings 386 cooperate with the compression rings 216 and bearings 392 cooperate with compression rings 228, in the same manner as previously described in connection with the first cage member 176 and its associated bearings 186 and 192 and rings 178 and 196.

An additional cage member 230 has a cup-like member 232 provided on one side thereof, comparable to the cage member 202, and a cup-like clutch member 234 formed on the opposite side thereof, comparable to the member 72 shown in FIGURE 1. The cage member 230 is rotatably mounted on the area of reduced diameter 214 of the shaft 208 through the bearing 236.

The bearings 386 carried by the cage member 376 are driven by the compression rings 216 and in turn, drive the cage member 376 and its associated bearings 392. These, in turn, drive the compression rings 228 which move in a planetary path around the portion 212 of the shaft 208. The compression rings 228 roll in frictional contact with the inner surface 238 of the cup member 232 and cause the latter to rotate about the area of reduced diameter 214 of the shaft 208. The clutch portion 234 of the cage 230 will, therefore, be rotated and carry with it the compression rings 240 and the stop bushings 242 in the same manner as the clutch member 72 in FIGURE 1.

The shaft 244 is held in frictional engagement by the nonrotating compression rings 240 so that it, too, rotates with the cage 230. The cage member 230 is disposed within the housing member 246 which is secured at one end of the housing member 220 by the clamp ring 248 and at the opposite end to a driven member, such as a control transformer 250 by the clamp ring 252.

The differential action of the two stages of the reducer shown in FIGURE 11 results from the compression rings 196 being normally urged to rotate with the shaft 170 as a unit about the area of reduced diameter 198. However, the bearings 192 carried by the cage 176 will be rotating with that cage in the same direction as the rotation of the shaft 170 but at a reduced rate. The end result is that there is relative motion between the shaft 170 and the compression rings 196, so that the latter will be individually rotated in a direction opposite to the direction of rotation of the shaft 170. This individual rotation of the compression rings 196 will in turn cause the cage 202 to rotate at a reduced rate in the opposite direction. The assembly including the cage 230 will operate in substantially the same manner and will cause the shaft 244 to rotate at a greatly reduced rate in a direction opposite to the rotation of the shaft 208.

Figure 12:
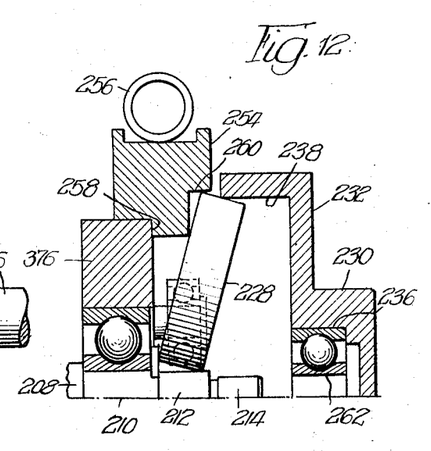
FIGURE 12 is a view in elevation, with certain parts cut away, of a portion of the device shown in FIGURE 11 showing the manner of assembly of this portion of that device and an assembly tool utilized in the assembly operation.

All the advantages, from the standpoint of ease of assembly, which have been outlined above with respect to the form of device shown in FIGURE 1, are equally present in the differential reducer which is illustrated in FIGURE 11. However, the manner of assembly of the two cup-like portions, namely, the cage 202 and the half 232 of the cage 230, is somewhat different since they do not carry any stop members for the compression rings 196 and 228, comparable to the flanged heads 190 provided to limit the cocking of compression rings 178 and 126. As shown in FIGURE 12, a special assembly tool may be utilized to carry out the step of inserting the shaft members 170 and 208 with respect to these compression rings 196 and 228. As illustrated in that figure, a loading tool 254, which may preferably be made in three arcuate pieces, is adapted to be held in association with the cage member 176 by the spring member 256 during the assembly process. A step 258 is provided on the inner edge on one side of the element 254 for receiving the upper edge of the cage 376 and a similar step 260 is provided on the opposite edge of the element 254 to receive one edge of a compression ring such as ring 228. The diametrically opposite edge is held in abutment with the area of reduced diameter 212 of the shaft 208. The configuration and dimensions of the loading tool segment 254 are such that the ring 228 when so disposed will be cocked outwardly at the point farthest removed from the shaft 208. This disposition of the compression rings 228 will permit the outer edge of the cup-like portion 232 of cage 230 to be brought into abutting relation with the outer surface of the ring members 228 as best shown in FIGURE 12. The area of reduced diameter 214 on the shaft 208 will then be in axial alignment with the center opening 262 of the bearing 236 and a compressive force applied along the longitudinal axis of the shaft 208 in a direction such that will tend to bring the shaft 208 and the cage 230 will cause a slight compression of the compression rings 228 and at that point the loading tool 254 can be removed by removal of the spring 256. Further compression in the manner indicated will cause the compression rings 228 to move into a plane substantially normal to the area of reduced diameter 212 and the rings will snap into the position shown in FIGURE 11. The area of reduced diameter 214 on the shaft 208 will then enter the opening 262 in the bearing 236 and the outer periphery of the compression rings 228 will be in rolling frictional engagement with the inner surface 238 of the cup-like portion 232 of the cage member 230. Although this method of assembly has been described only in connection with the compression rings 228 and the cup-like member 232, it is obvious that the same procedure can be applied to the compression rings 196 and the cup-like cage member 202.

Figure 13:
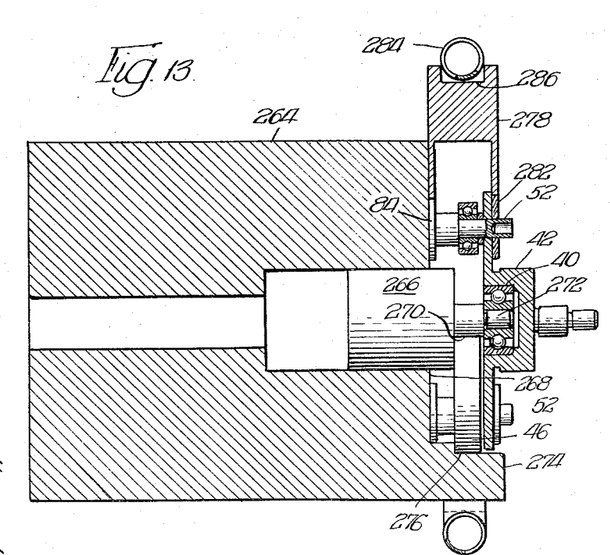
FIGURE 13 is a view in elevation, with certain parts cut away, of a portion of the device shown in FIGURE 1 showing the manner of assembly of this portion of that device and an assembly tool utilized in the assembly operation.
Figure 14:
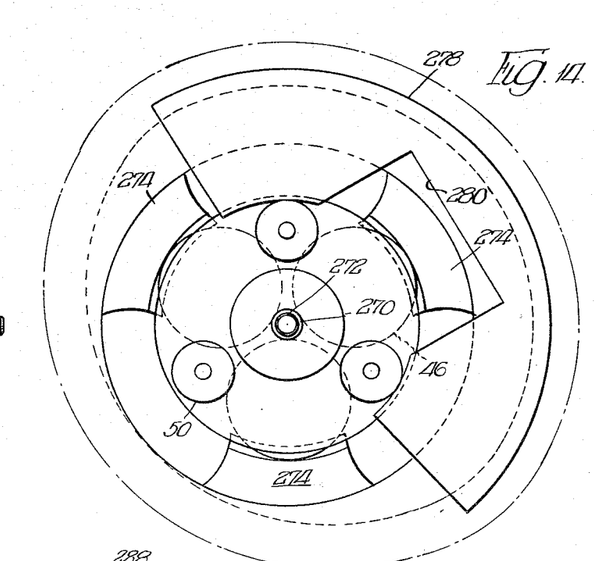
FIGURE 14 is a somewhat diagrammatic plan view of the portion of the device of FIGURE 1 shown in FIGURE 13, showing the manner of assembly of this portion and an assembly tool utilized for this purpose.

FIGURES 13 and 14 illustrate the manner in which one of the components of FIGURE 1 may be assembled prior to being inserted in the housing 20 and prior to receiving the shaft 26. As shown in FIGURE 13, an assembly tool 264 of generally cylindrical configuration is provided having a cylindrical boss 266 projecting from the base 268 of the tool. A shaft of substantially reduced diameter 270 projects in turn from the boss 266 and an area of reduced diameter 272 projects further from the shaft 270. Three arcuate symmetrically spaced segments 274 project from the base along its periphery. Each of these segments 274 is provided with a step portion 276 on its inner surface which is in alignment with the end of the boss 266. The area of reduced diameter 272 on the shaft 270 is of a diameter such that it is adapted to be received within the bearing 40 of the cage member 42. Likewise, the inner edges of the segments 274 are spaced from the shaft 270 a distance substantially equal to the diameter of the compression rings 46. The diameter of the shaft 270 is slightly smaller than the diameter of the area of reduced diameter 44 of the shaft 26, although the radius between the center of the shaft 270 and the inner edge of the segment 274 is identical with the radius of the housing member 20 of the device shown in FIGURE 1.

Actual assembly of the case 42 and its associated elements is carried out by first securing one of the bearing members 50 in fixed position with respect to the cage member 42 by setting the eyelet or rivet 52. After the bearing member 50 is so located, the compression rings 46 are symmetrically disposed about the shaft 270 in the face of the tool 264 and the two additional bearing members 50 are disposed therebetween as shown in FIGURE 14. The cage member 42 is then positioned on the reduced area portion 272 of the shaft 270, as shown in FIGURE 13, and the rivet members 52 are received in suitable openings provided in the cage member 42 for that purpose. The openings have a diameter somewhat larger than the diameter of the rivet member 52 so that it is possible to make some selection in the positioning of the two unsecured bearings.

In order to properly position the two remaining unsecured bearings 50, a clevis tool 278, having a generally arcuate configuration as shown in FIGURE 14, is utilized. A recess 280 is formed therein which provides clearance for the segment 274 disposed opposite to the bearing member 50 which has already been secured to the cage member 42. The two extremities of the clevis tool 278, on opposite sides of the recess 280, are adapted to abut the flanged heads 84 of the rivet members 52, and the shim 282 on the rivet 52 at the opposite extremity. A compression spring 284 in the form of a loop is adapted to then be received in the peripheral groove 286 in the clevis tool 278 and to abut the two segments 274 of the tool 264 oppositely disposed to the clevis tool 278, as best shown in FIGURE 14.

The dimensions and tension of the spring 284 are selected so that the amount of pressure applied to the two unsecured bearing members 50 will cause the latter to slightly compress the compression rings 46 which are in abutment with the bearing members 50, the shaft 270 and the segments 274 of the assembly tool 264.

As previously mentioned, the shaft 270 has a diameter slightly smaller than the diameter of the area of reduced diameter 44 of the shaft 26 so that the rings 46 are disposed in the tool 264 at a point somewhat closer to the axis of the shaft 270 than they will be in the final assembly, as shown in FIGURE 1. After the components are properly placed in the tool 264 as just described, the two rivets supporting the as yet unsecured bearing members 50 are upset with a suitable tool and the two rivets and members 50 supported thereby are now permanently secured in the position selected by the use of the assembly tool 264, the clevis tool 278 and the spring member 284. After the two bearing members 50 are so secured, the spring member 284 may be removed along with the clevis tool 278. The cage member 42 may then be removed from association with the tool 264, but since the rings 46 are now held in place only by the operation of the segments 274, it is preferable to move the cage member 42 directly into the housing 20, shown in FIGURE 1. Withdrawal of the reduced diameter portion 272 of the shaft 270 of the tool 264 from the bearing 40 in the cage member 42 and the withdrawal of the shaft 270 from association with the compression rings 46 will, of course, permit the subsequent insertion of the shaft 26 between the compression rings 46 and into the bearing 40, as previously described. The fact that the area of reduced diameter 44 of the shaft 26 is of a larger diameter than the corresponding portion of the shaft 270 results in additional compression being applied to the compression rings 46 of a preselected amount when the elements are all assembled as shown in FIGURE 1.

The final assembly of the cage member 42 and its associated components by the use of the tools 264 and 278 as described will insure that all of the compressive forces are in substantial balance and the various components are placed entirely symmetrically. The accurate positioning of these components obtained by this method is required in order to maintain the high degree of precision demanded in devices of this nature.

Figure 15:
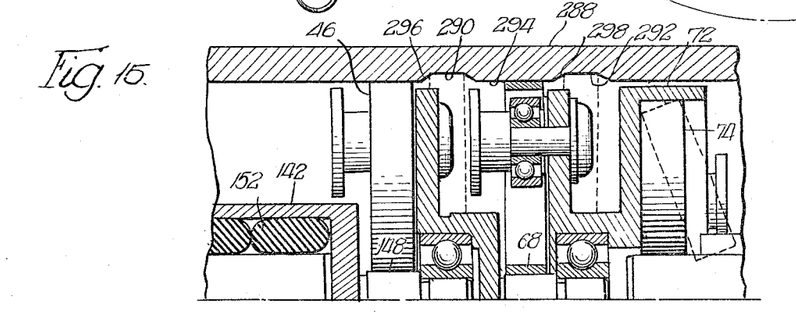
FIGURE 15 is a detailed view in elevation, with certain parts cut away, of a fragmentary portion of an alternate form of device incorporating the invention, the device being generally in the form illustrated in FIGURE 1 with certain modifications.

Referring now to FIGURE 15, a fragmentary portion of an alternative embodiment of the device shown in FIGURE 1 is disclosed therein. The principal modification is in the housing 288, which element takes the place of the housing 20 shown in FIGURE 1. Two circumferential grooves 290 and 292 are provided in the inner surface 294 of the housing 288. These grooves have a width at the base sufficient to accommodate the compression rings 46 and 68, respectively. The edges of the two grooves 290 and 292 are beveled so as to provide cam surfaces 296 and 298 between the inner surface 294 of the housing 288 and the base of the two grooves 290 and 292, respectively.

If the reducer is assembled initially with the components within the housing 288 disposed so that the compression rings 46 are received in the groove 290, as shown in dotted lines in FIGURE 15, and the compression rings 68 are received in the groove 292, also as shown in dotted lines, the components of the reducer can be brought into operative, assembled relation without the necessity of cocking the compression rings 46 and 68, as previously described in connection with the assembly of the form of device shown in FIGURE 1. If an adapter 142 is utilized for the drive shaft, such as the shaft 160 shown in FIGURE 10, then all of the elements within the housing 288, except for the input and output shafts, can be assembled as described with the compression rings in the grooves 290 and 292 as shown in dotted lines in FIGURE 15. Subsequently, the entire assembly can be shifted laterally to the left (as viewed in FIGURE 15) a sufficient distance to cause the compression rings 46 and 68 to ride up over the beveled surfaces 296 and 298, respectively, into the position shown in full lines in FIGURE 15. Such a shifting of the rings will produce a substantial compression thereof, since the diameter of the surface 294 of the housing 288 is substantially less than the diameter of the grooves 290 and 292. Such a compression will be comparable to that obtained by the earlier described method of first cocking the rings and then inserting the drive shaft therebetween so that the rings are compressed and snap into the operative position. As shown in FIGURE 15, the rings 74 of the clutch 72 will still be assembled by the cocking method and compression which takes place when the input shaft of the next element of the assembly is inserted therebetween.

An added advantage of the motion transmitting mechanisms which have been described (including the adapter 142 shown in FIGURE 10) is the fact that they will permit the use of less accurate and therefore, less expensive mounting devices. This results from the "universal joint" characteristic of the drive connection between units. The adapter 142, for example, will operate very satisfactorily even though the axis of the input shaft 154 is not in exact alignment with the shaft 148. The mountings for the drive motor and the remaining components, therefore, need not be as precise as would otherwise be the case. The same is true of the shaft 34 in FIGURE 1 in relation to the shaft 70, since the rings 74 are resilient and will give a universal character to the driving engagement between the cage 72 and the shaft 34.

Figure 16:
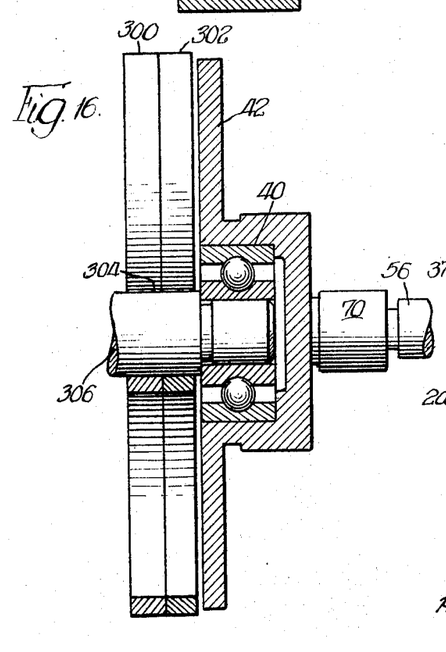
FIGURE 16 is a view in elevation, with certain parts cut away, of still another alternate form of device incorporating the invention, the device being generally in the form illustrated in FIGURE 1 with certain modifications.

Still another advantage of the invention is that the amount of input torque and load torque that is required in a particular installation can readily be attained by selective adjustment of the thickness of the compression rings. Furthermore, as shown in FIGURE 16, it is also possible to utilize more than one ring at each location. In place of one of the rings 46, shown in FIGURE 1, a pair of laterally adjacent rings 300 and 302 are provided in the form shown in FIGURE 16. This permits a selective adjustment of the area of contact between the rings 300 and 302 and the abutting drive surface 304 of the shaft 306.

Therefore, not only the thickness of the rings can be selectively varied but the amount of ring surface in rolling frictional contact with the driving and driven surfaces can likewise be varied. The rings 300 and 302 in FIGURE 16 have a thickness substantially greater than that of rings 46 in FIGURE 1, and therefore exert a greater compressive force on the shaft 306. Also, a larger area of contact exists between the compression rings and the shaft 306. Therefore, for two reasons the input torque which can be handled by this embodiment in FIGURE 16 is substantially greater than that which can be applied to the form shown in FIGURE 1.

It may thus be seen that the invention successfully provides a type of motion transmitting mechanism which is particularly useful as a planetary frictional drive or as a frictional clutch, or a combination of the two. It provides devices having a high degree of precision and which are particularly useful in electromechanical control systems of the so-called miniature component form. The novel methods of assembly of both the motion transmitting mechanisms and the planetary frictional drives and frictional clutches incorporating such mechanisms make possible the use of constructions previously not regarded as practical.

In the drawings and specification, there has been set forth several preferred embodiments of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. In a motion transmitting mechanism adapted to be operably associated with a drive shaft, a housing having a cylindrical inner surface, a plurality of compressible circular members symmetrically disposed within said housing in abutting relation to the cylindrical inner surface thereof, the configuration and disposition of said housing and said circular members being such as to maintain said members normally in a plane normal to the axis of said housing but permitting initial disposition of said members in relation to said housing so that said members are not in compressive abutting relation thereto, but are capable of being put under such compression by movement thereof generally along the axis of and relative to said housing.

2. In a motion transmitting mechanism adapted to be operably associated with a drive shaft, a housing having a cylindrical inner surface, a plurality of compressible circular members symmetrically disposed within said housing in abutting relation to the cylindrical inner surface thereof and to each other, the configuration and disposition of said housing and said circular members being such as to maintain said members normally in a plane normal to the axis of said housing but permitting initial disposition of said members in relation to said housing, so that said members are not in compressive abutting relation thereto, or to each other, but are capable of being put under such compression by movement thereof generally along the axis of and relative to said housing.

3. In a motion transmitting mechanism adapted to be operably associated with a drive shaft, a housing having a cylindrical inner surface, a plurality of compressible circular members symmetrically disposed within said housing in abutting relation to the cylindrical inner surface thereof and normally in a plane normal to the axis thereof, said circular members having a diameter less than the distance between at least portions of said housing and said shaft, the configuration and disposition of said circular members, housing and shaft being such that said members may be compressed between said portions of said housing and said shaft by imparting relative movement to said members and at least one of said portions, along an axis parallel to said shaft.

4. In a motion transmitting mechanism adapted to be operably associated with a drive shaft, a housing having a plurality of cylindrical inner surfaces of different diameters with beveled surfaces therebetween, a plurality of compressible circular members adapted to be symmetrically disposed within said housing in abutting but substantially uncompressed relation to one of the cylindrical inner surfaces thereof of larger diameter, the configuration and disposition of said circular members, housing and shaft being such that said members may be compressed between the portions of smaller diameter of said housing and said shaft by imparting relative movement to said members and at least one of said portions, along an axis parallel to said shaft.

5. In a motion transmitting mechanism adapted to be operably associated with a drive shaft having a plurality of surfaces of different diameters with beveled surfaces therebetween, a housing having a cylindrical inner surface, a plurality of compressible circular members symmetrically disposed within said housing in abutting relation to the cylindrical inner surfaces thereof and normally in a plane normal to the axis thereof, said circular members having a diameter less than the distance between said housing and at least portions of said shaft, the configuration and disposition of said members, housing and shaft being such that said members may be compressed between portions of said housing and said shaft by imparting relative movement to said members and at least one of said portions, along an axis parallel to said shaft.

6. In a motion transmitting mechanism adapted to be operably associated with a drive shaft, a housing having a cylindrical inner surface, a plurality of compressible ring members symmetrically disposed within said housing in abutting relation to the cylindrical inner surface thereof and normally in a plane normal to the axis thereof, and a plurality of retaining members laterally fixed with respect to said compressible ring members, the configuration and disposition of said retaining members being such as to maintain said ring members normally in said plane normal to the axis of said housing but permitting said ring members to be cocked a predetermined amount relative to the axis of said housing so that portions of said rings adjacent said axis extend outwardly toward said drive shaft so as to permit the initial insertion of said drive shaft therebetween, and to permit a reseating of said ring members in said plane normal to the axis of said housing by further insertion of said shaft.

7. In a motion transmitting mechanism adapted to be operably associated with a drive shaft, a housing having a cylindrical inner surface, a plurality of compressible ring members symmetrically disposed within said housing in abutting relation to the cylindrical inner surface thereof and normally in a plane normal to the axis thereof, and a plurality of retaining members each disposed between two of said ring members in abutting relation thereto at a fixed distance from the axis of said housing, adapted to maintain said ring members in abutment with said cylindrical inner surface of said housing but permitting said ring members to be cocked a predetermined amount relative to the axis of said housing so as to permit the initial insertion of said drive shaft therebetween, and to permit a reseating of said ring members in said plane normal to the axis of said housing by further insertion of said shaft.

8. In a motion transmitting mechanism adapted to be operably associated with a drive shaft, a housing having a cylindrical inner surface, a plurality of compressible ring members symmetrically disposed within said housing in abutting relation to the cylindrical inner surface thereof and normally in a plane normal to the axis thereof, and a plurality of non-rotatable retaining members carried by said housing, each disposed between two of said ring members in abutting relation thereto at a fixed distance from the axis of said housing, adapted to maintain said ring members in abutment with said cylindrical inner surface of said housing but permitting said ring members to be cocked a predetermined amount relative to the axis of said housing so as to permit the initial insertion of said drive shaft therebetween, and to permit a reseating of said ring members in said plane normal to the axis of said housing by further insertion of said shaft, so that rotation of said drive shaft causes said ring members, said retaining members and said housing to rotate as a unit.

9. In a motion transmitting mechanism adapted to be operably associated with two coaxial drive shafts, a housing having a pair of adjacent cylindrical surfaces, a pair of groups of compressible ring members each symmetrically disposed within said housing in abutting relation to one of the cylindrical inner surfaces thereof and normally in a plane normal to the axis thereof, and a plurality of retaining members each disposed between two of said ring members in abutting relation thereto at a fixed distance from the axis of said housing, adapted to maintain said ring members in abutment with said cylindrical inner surfaces of said housing but permitting said ring members to be cocked a predetermined amount relative to the axis of said housing so as to permit the initial insertion of one of said drive shafts therebetween, and to permit a reseating of said ring members in said plane normal to the axis of said housing by further insertion of said shaft.

10. In a motion transmitting mechanism adapted to be operably associated with a drive shaft, a housing having a cylindrical inner surface, a plurality of compressible ring members symmetrically disposed within said housing in abutting relation to the cylindrical inner surface thereof and normally in a plane normal to the axis thereof, and a plurality of retaining members each disposed between two of said ring members in abutting relation thereto at a fixed distance from the axis of said housing, adapted to maintain said ring members in non-rotating frictional contact with said cylindrical inner surface so that rotation of said shaft is transmitted directly through said frictionally held ring members to said housing.

11. In a motion transmitting mechanism adapted to be operably associated with a drive shaft, a housing having a cylindrical inner surface, a plurality of compressible ring members symmetrically disposed within said housing in abutting relation to the cylindrical inner surface thereof and normally in a plane normal to the axis thereof, and a plurality of rotatable retaining members each disposed between two of said ring members in abutting relation thereto at a fixed distance from the axis of said housing, adapted to maintain said ring members in rotating frictional contact with said cylindrical inner surface so that rotation of said shaft causes said ring members to rotate and to carry said rotatable retaining members therewith around the axis of said shaft.

12. In a motion transmitting mechanism adapted to be operably associated with a drive shaft, a fixed housing having a cylindrical inner surface, a plurality of compressible ring members symmetrically disposed within said housing in abutting relation to the cylindrical inner surface thereof and normally in a plane normal to the axis thereof, a cage member mounted for rotation on the axis of said housing, a plurality of rotatable retaining members carried by said cage member each disposed between two of said ring members in abutting relation thereto at a fixed distance from the axis of said housing, adapted to maintain said ring members in rotating frictional contact with said cylindrical inner surface of said housing but permitting said ring members to be cocked a predetermined amount relative to the axis of said housing so as to permit the initial insertion of said drive shaft therebetween, and to permit a reseating of said ring members in said plane normal to the axis of said housing by further insertion of said shaft, and an output shaft carried by said cage member coaxially disposed with said housing so that rotation of said drive shaft causes said ring members to rotate and to carry said rotatable retaining members therewith around the axis of said drive shaft so that said cage member and said output shaft are rotated at a reduced speed.

13. In a motion transmitting mechanism adapted to be operably associated with a drive shaft, a fixed housing, a cup shaped cage member mounted for rotation on the axis of said housing, having a cylindrical inner surface, a plurality of compressible ring members symmetrically disposed within said cage member in abutting relation to the cylindrical inner surface thereof and normally in a plane normal to the axis thereof, and a plurality of retaining members each disposed between two of said ring members in abutting relation thereto at a fixed distance from the axis of said cage member and rotatably carried thereby, said retaining members being adapted to maintain said ring members in abutment with said cylindrical inner surface of said cage member but permitting said ring members to be cocked a predetermined amount relative to the axis of said cage member so as to permit the initial insertion of said drive shaft therebetween, and to permit a reseating of said ring members in said plane normal to the axis of said cage member by further insertion of said shaft.

14. An adapter for a drive shaft to provide an extension therefor of a selected diameter different than that of said drive shaft comprising a cup-like member, having a cylindrical inner surface, a plurality of compressible ring members disposed in stacked coaxial relation within said cup-like member, each ring member having an outer diameter such that the outer periphery thereof is disposed in snug fitting relation to the inner surface of said cup-like member, said ring members having an inner diameter such that said drive shaft may be inserted therethrough to slightly compress said ring member against said inner surface, and an output shaft secured to and coaxial with said cup-like member.

15. A motion transmitting mechanism adapted to be operably associated with a drive shaft comprising a cylindrical cup member, a coaxial output shaft extending outwardly from the base of said member, and a plurality of resilient, compressible, substantially toroidal ring members disposed in laterally adjacent relation within said cylindrical cup member in frictional driving engagement therewith, and adapted to receive said drive shaft in compressing frictional driving engagement.

No references cited.

DAVID J. WILLIAMOWSKY, *Primary Examiner.*

L. H. GERIN, *Assistant Examiner.*